United States Patent
Niu et al.

(10) Patent No.: US 10,977,760 B2
(45) Date of Patent: Apr. 13, 2021

(54) METHOD FOR EMBEDDING SPREAD SPECTRUM WATERMARK INTO IMAGES WITH SELF-ADAPTIVE EMBEDDING STRENGTH

(71) Applicant: TAIYUAN UNIVERSITY OF TECHNOLOGY, Taiyuan (CN)

(72) Inventors: Baoning Niu, Taiyuan (CN); Ying Huang, Taiyuan (CN); Hu Guan, Taiyuan (CN); Shuwu Zhang, Taiyuan (CN); Jie Liu, Taiyuan (CN)

(73) Assignee: TAIYUAN UNIVERSITY OF TECHNOLOGY, Taiyuan (CN)

(*) Notice: Subject to any disclaimer, the term of this patent is extended or adjusted under 35 U.S.C. 154(b) by 61 days.

(21) Appl. No.: 16/556,262

(22) Filed: Aug. 30, 2019

(65) Prior Publication Data

US 2020/0074582 A1 Mar. 5, 2020

(30) Foreign Application Priority Data

Aug. 31, 2018 (CN) .......................... 201811009168.3

(51) Int. Cl.
*G06T 1/00* (2006.01)
*H04B 17/318* (2015.01)

(52) U.S. Cl.
CPC .......... *G06T 1/0028* (2013.01); *G06T 1/0092* (2013.01); *H04B 17/318* (2015.01);
(Continued)

(58) Field of Classification Search
CPC ................. G06T 1/0028; G06T 1/0092; G06T 2201/0052; G06T 2201/0051; H04B 17/318

See application file for complete search history.

(56) References Cited

U.S. PATENT DOCUMENTS

2002/0009208 A1* 1/2002 Alattar ............. G06Q 20/40145
382/100

OTHER PUBLICATIONS

"Combined DWT-DCT digital image watermarking" (published in Journal of Computer Science, Sep. 2007, pp. 740-746) (Year: 2007).*

(Continued)

*Primary Examiner* — Casey L Kretzer
(74) *Attorney, Agent, or Firm* — Bayramoglu Law Offices LLC (57) ABSTRACT

A method for embedding the spread spectrum watermark into images with the self-adaptive embedding strength includes the following steps: designing a spread spectrum watermark capable of completely shielding a host signal interference by using prior knowledge of the host signal interference, self-adaptively adjusting a value of an embedding strength in the spread spectrum watermark with different host images, ensuring imperceptibility of each image while simultaneously maximizing robustness of the watermark, and finally embedding the spread spectrum watermark in the host image. The present disclosure can not only completely shield the host signal interference but also effectively withstand various common image processing attacks and geometric attacks, and at the same time, all the watermarked images can obtain consistent imperceptibility. The present disclosure can be applied to various watermarking techniques based on discrete cosine transform.

3 Claims, 3 Drawing Sheets

Performing the DCT on the watermarked image to obtain a DCT coefficient matrix, and constructing a feature vector

↓

Randomly generating *m* orthogonal unit code vectors using the secret key identical to that in the embedding method

↓

Extracting the embedded watermark according to the correlation between the feature vector and the code vector (52) U.S. Cl.
CPC ............ *G06T 2201/0051* (2013.01); *G06T 2201/0052* (2013.01)

(56) References Cited

OTHER PUBLICATIONS

Cox et al, "Secure Spread Spectrum Watermarking for Multimedia" (published in IEEE Transactions on Image Processing, vol. 6, No. 12, Dec. 1997, pp. 1673-1687) (Year: 1997).*

Hu et al, "Collective blind image watermarking in DWT-DCT domain with adaptive embedding strength governed by quality metrics" (published in Multimedia Tools Appl 76, Feb. 2016, pp. 6575-6594) (Year: 2016).*

* cited by examiner

FIG. 1

|   | 0 | 1 | 2 | 3 | 4 | 5 | 6 | 7 |
|---|---|---|---|---|---|---|---|---|
| 0 | 1 |   | 5 |   | 7 |   | 9 |   |
| 1 |   |   |   |   |   |   |   |   |
| 2 | 6 |   | 2 |   | 11 |   | 13 |   |
| 3 |   |   |   |   |   |   |   |   |
| 4 | 8 |   | 12 |   | 3 |   | 15 |   |
| 5 |   |   |   |   |   |   |   |   |
| 6 | 10 |   | 14 |   | 16 |   | 4 |   |
| 7 |   |   |   |   |   |   |   |   |

METHOD FOR EMBEDDING SPREAD SPECTRUM WATERMARK INTO IMAGES WITH SELF-ADAPTIVE EMBEDDING STRENGTH

CROSS REFERENCE TO THE RELATED APPLICATIONS

This application is based upon and claims priority to Chinese Patent Application No. 201811009168.3, filed on Aug. 31, 2018, the entire contents of which are incorporated herein by reference.

TECHNICAL FIELD

The embodiments of the present disclosure relate to the technical field of copyright protection of digital images, specifically to a method for embedding a spread spectrum watermark into images with a self-adaptive embedding strength.

BACKGROUND

With the rapid development of computer, Internet and digital media technologies, digital media contents including images can be readily produced, disseminated, copied and modified on the Internet, which brings convenience to people, whilst causes serious digital copyright issues. In recent years, the digital copyright has attracted more and more attention. It is obvious that digital copyright infringement imposes a great impact on interests of copyright holders. A combat against copyright infringement has become a common concern in all walks of life, especially in industry and academia, a demand for a boycott of the copyright infringement is becoming more and more prominent. Image watermarking technology provides a good solution for addressing digital image copyright protection issues, wherein a digital mark that identifies copyright is embedded into an image in an imperceptible manner, and this mark is also called a watermark. When a copyright dispute occurs, an ownership of the image can be identified by extracting the watermark. As an effective means for the copyright protection of digital images, though the image watermarking technology has been developed for more than 20 years and a huge progress has been made, there are still some imperative problems to be solved in both academic research and engineering applications.

A good digital watermarking technique has to possess both imperceptibility and robustness. Imperceptibility requires the watermark to be embedded in the image without compromising the quality and practicability of the image. Robustness means the watermark can be extracted correctly even when the image is distorted by various attacks (e.g., noise superimposition, content compression, dimensional change, etc.). Unfortunately, there exists contradiction between the imperceptibility and the robustness, of an image watermarking method. Increasing the robustness is usually at the cost of reduced imperceptibility, and vice versa. They are mutually constrained. An effective watermarking technique requires an appropriate trade-off between them.

Selection of the embedding domain, determination of the embedding locations, and design of the embedding and extracting schemes are the primary concerns in the intact watermarking framework. The embedding domain of the watermark is divided into a spatial domain and a transform domain. A transform domain watermarking technology has better imperceptibility and robustness than a spatial domain watermarking technology. Commonly used domain transformations include a discrete cosine transformation (DCT), a discrete wavelet transformation (DWT), and a discrete Fourier transformation (DFT), etc. Among these domain transformation methods, the DCT has an advantage of energy compression, so that better imperceptibility can be obtained when the watermark is embedded in a DCT domain. The embedding locations of the watermark depends on the selection of the embedding domain. Usually, the embedding locations are determined by exploring some stable characteristics of an embedding domain coefficient matrix, so that the watermark can be embedded into these locations synchronously to a certain extent. The design of the embedding method is the core of the watermarking technology and closely related to robustness and imperceptibility of the watermarking technology.

At present, the common embedding method is a spread spectrum method. The spread spectrum method converts every bit of the watermark into an independent code vector, a sequence of real numbers, and then adds it into the coefficients of the transform domain of the host image. At the decoder, the embedded watermark can be extracted by correlating the coefficients of the transform domain embedding the watermark to the code vectors. With the high embedding capacity, simple structure of the decoder, and enhanced robustness to noise, the spread spectrum scheme is attractive to the digital watermarking field. However, the main problem of this method is an existence of host signal interference, i.e., an influence of the image's own information on the watermark extraction, which leads to a degradation of the watermark extraction performance.

The spread spectrum method generally employs a parameter called embedding strength to control the embedding energy of the watermark. A value of the embedding strength determines robustness of the watermarking method. Increasing the value can improve robustness, but at the same time increase the embedding energy of the watermark, thereby leading to a decrease in imperceptibility and vice versa. Setting the embedding strength should consider both robustness and imperceptibility. Most of the existing spread spectrum methods use a fixed embedding strength in the course of embedding watermarks into each image, wherein only robustness of the watermarking method is taken into account, while good imperceptibility of watermark cannot be ensured in each watermarked image because imperceptibility depends on the embedding energy of the watermark, which is related to the image itself. The embedding energy of the watermark are different for different images, so imperceptibility of each image is different, intensifying the conflict between robustness and imperceptibility.

SUMMARY

The present disclosure proposes a method for embedding a spread spectrum watermark into images with a self-adaptive embedding strength in light of an application scenario of embedding a watermark in a DCT domain, in order to solve the problem that in the spread spectrum method, a host signal interference exists and robustness and imperceptibility cannot be simultaneously ensured by using a fixed embedding strength.

To achieve the aforementioned objective, the method for embedding the spread spectrum watermark into images with the self-adaptive embedding strength is provided, which includes the following steps:

performing a discrete cosine transform (DCT) on a host image to obtain a DCT coefficient matrix, and constructing a feature vector;

converting a binary watermark to be embedded into a spread spectrum watermark with a self-adaptive embedding strength, and embedding the spread spectrum watermark into the feature vector; and using the feature vector embedded with the spread spectrum watermark to update the DCT coefficient matrix, then performing an inverse discrete cosine transform (IDCT) on the DCT coefficient matrix to obtain an image embedded with the watermark.

Specifically, the step of performing the discrete cosine transform on the host image, obtaining the DCT coefficient matrix, and constructing the feature vector includes the following steps:

performing a discrete cosine transform on the host image to be embedded with the watermark; and picking n coefficients from the DCT coefficient matrix to construct the feature vector, wherein the feature vector is expressed as $V=[v_0, v_1, \ldots, v_{n-1}]$.

Specifically, the step of converting the binary watermark to be embedded into the spread spectrum watermark with the self-adaptive embedding strength, and embedding the spread spectrum watermark into the feature vector includes the following steps:

initializing an original binary watermark, wherein the original watermark is expressed as $W=[w_0, w_1, \ldots, w_{m-1}]$, a length of W is m, $w_i \in \{0,1\}$, the watermark is initialized as $W_I=[l_0, l_1, \ldots, l_{m-1}]$, an initializing method is described as follows:

$$l_i = \begin{cases} 1, & w_i = 1 \\ -1, & w_i = 0 \end{cases}, i = 0, i, \ldots, m-1 \quad (1)$$

randomly generating m orthogonal unit code vectors; assuming an $i^{th}$ code vector is $P_i=[p_{i0}, p_{i1}, \ldots, p_{i(n-1)}]$, a length of $P_i$ is n (n≥m), i=0, 1, ..., m-1; wherein $C(P_i, P_i)=1$ and $C(P_i, P_j)=0$ (i≠j), C(•) represents an inner product of two vectors;

converting, according to the equation (2), an initialized watermark into the spread spectrum watermark with the self-adaptive embedding strength; wherein the spread spectrum watermark is expressed as $W'=[w_0', w_1', \ldots, w_{m-1}']$, a length of W' is n (n≥m), an expression of W' is as follows:

$$W' = \sum_{i=0}^{m-1} ((A \cdot l_i \cdot \lambda_i \cdot C(V, P_i)) \cdot P_i) \quad (2)$$

in the equation (2), $C(V, P_i)$ is related to information of the host image and represents a host signal interference; a control parameter $\lambda_i$ is used to control the host signal interference, and satisfies $$\begin{cases} \lambda_i \leq 1, & C(V, P_i) \cdot l_i \geq 0 \\ \lambda_i \geq 1, & C(V, P_i) \cdot l_i < 0 \end{cases}, i = 0, 1, \ldots, m-1;$$

A represents the embedding strength of the watermark for adjusting robustness of a watermarking method, and satisfies A≥0.

As shown in the equation (3), embedding the spread spectrum watermark into the feature vector by a superimposition, the feature vector embedded with the watermark is $V'=[v_0', v_1', \ldots, v_{n-1}']$.

$$V'=V+W' \quad (3)$$

Specifically, the step of converting the initialized watermark into the spread spectrum watermark with the self-adaptive embedding strength includes the following steps:

setting an optimized value of the control parameter $\lambda_i$: when $C(V, P_i)$ and $l_i$ have a same sign, and satisfy one of two conditions as follows, setting $\lambda_i$ as 0, otherwise, setting $\lambda_i$ as 1;

$$\sum_{i=0}^{m-1} C(V, P_i)^2 - \frac{\left(\sum_{i=0}^{m-1} (l_i \cdot C(V, P_i))\right)^2}{m} \geq \frac{255^2 \cdot M \cdot N}{10^{PSNR/10}} \quad (4)$$

$$\frac{\sum_{i=0}^{m-1} (l_i \cdot C(V, P_i))}{m} < 0 \text{ and } \sum_{i=0}^{m-1} C(V, P_i)^2 \geq \frac{255^2 \cdot M \cdot N}{10^{PSNR/10}} \quad (5)$$

self-adaptively obtaining a value of the embedding strength A; a relationship between the embedding strength A and a peak signal-to-noise ratio (PSNR) is expressed as the equation (6):

$$mA^2 + \sum_{i=0}^{m-1} (\lambda_i \cdot C(V, P_i))^2 - 2A \sum_{i=0}^{m-1} (l_i \cdot \lambda_i \cdot C(V, P_i)) = \frac{255^2 \cdot M \cdot N}{10^{PSNR/10}} \quad (6)$$

the equation (6) establishes a relationship between robustness and imperceptibility; as values of the PSNR and $\lambda_i$ are given, the equation (6) is figured out using a binary search algorithm, so that a maximum value of the embedding strength A can be quickly calculated; and according to the equation (2), converting the initialized watermark into the spread spectrum watermark.

Compared with the prior art, the aforementioned technical solution at least has the following advantages:

In the method for embedding the spread spectrum watermark into images with the self-adaptive embedding strength, by using a priori knowledge of the host signal interference, the spread spectrum watermark is designed. It is theoretically proven that the spread spectrum watermark can completely shield the host signal interference; and the optimal value of the parameter used to control the host signal interference in the spread spectrum watermark is analyzed to facilitate a tradeoff between robustness and imperceptibility of the watermarking method. Moreover, the value of the embedding strength can be self-adaptively adjusted with different host images, so that each image can obtain the specified peak signal-to-noise ratio, which not only maximizes robustness of the watermarking method, but also ensures imperceptibility of each watermarked image. Meanwhile, the binary search algorithm is employed to obtain the embedding strength, which greatly improves a solving efficiency. The present disclosure can shield the host signal interference, effectively resist a variety of image processing attacks and geometric attacks, and be applied to various watermarking techniques based on the discrete cosine transform.

BRIEF DESCRIPTION OF THE DRAWINGS

The drawings, as a part of the present disclosure, are to provide a further understanding of the present disclosure. The illustrative embodiments of the present disclosure are merely used for illustrating the present disclosure, rather than improperly limiting the present disclosure. Obviously, the drawings in the following descriptions are merely some embodiments. As for those of ordinary skill in the art, other drawings can be obtained without creative work based on the drawings of the present disclosure. In the drawings.

These drawings and literal descriptions are not intended to limit the scope of the inventive concept of the present disclosure in any way, but illustrate the concept of the present disclosure for those skilled in the art with reference to the specific embodiments.

DETAILED DESCRIPTION

The technical problems to be solved, technical solutions employed, and the technical effects achieved by the embodiments of the present disclosure are described clearly and completely hereinafter with reference to the drawings and specific embodiments. Obviously, the described embodiments are merely a part of embodiments of the present disclosure, rather than all. All other equivalent or obviously modified embodiments made by those of ordinary skill in the art without creative work based on the embodiments of the present disclosure should also be considered as falling within the scope of the present disclosure. The embodiments of the present disclosure can be implemented in a variety of manners defined and covered by claims.

It should be noted that, many specific details are given in the following descriptions for facilitating comprehension. However, obviously the present disclosure can be implemented without these specific details.

It should be noted that, without clear limit or conflict, various embodiments of the present disclosure and the technical features thereof can mutually be combined to form technical solutions.

Figure 1:
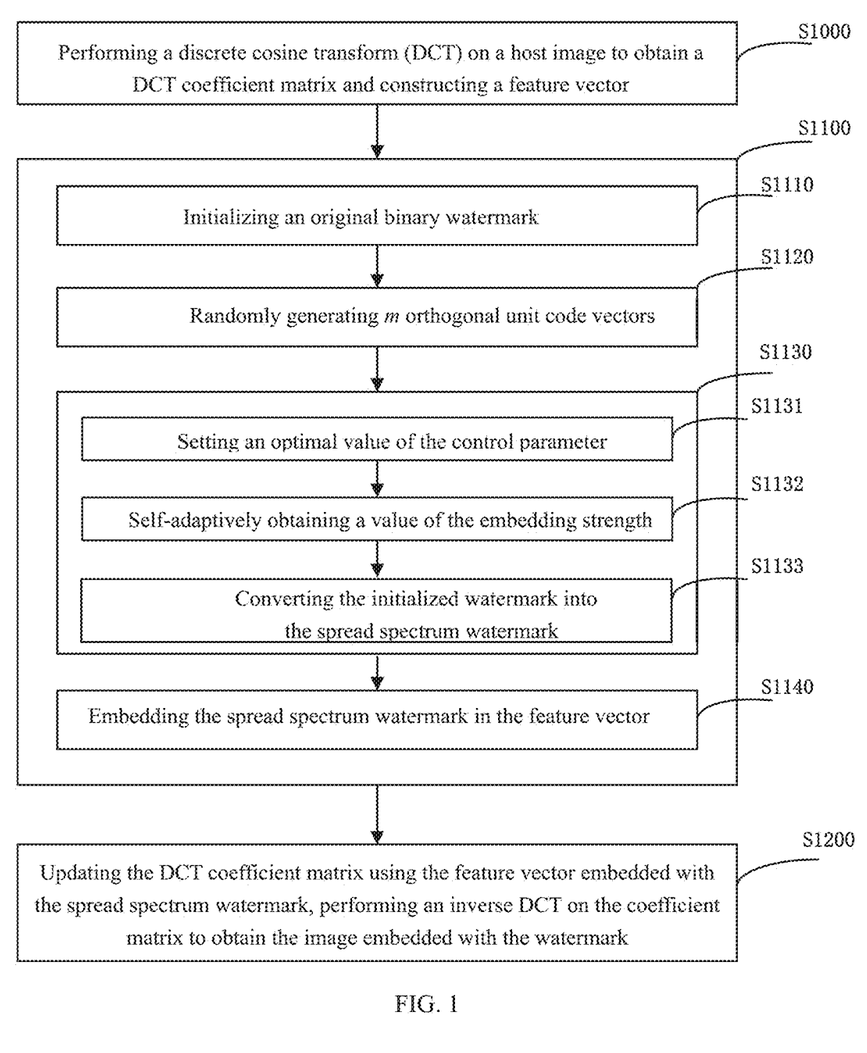
FIG. 1 is a schematic block diagram of a method for embedding the spread spectrum watermark into images with the self-adaptive embedding strength.

The embodiments of the present disclosure provide a method for embedding the spread spectrum watermark into images with the self-adaptive embedding strength. As shown in FIG. 1, the method includes step S1000 to step S1200.

Step S1000: a discrete cosine transform (DCT) is performed on a host image to obtain a DCT coefficient matrix, and a feature vector is constructed.

In a preferred embodiment, a two-level discrete cosine transform is performed on an image to be embedded with a watermark. Specifically, the present step further includes: step S1010 to step S1030.

Step S1010: a minimal magnification is carried out on the host image to achieve a height and a width of the host image larger than k×K and evenly divided by K. Where, k∈N$^+$, K∈N$^+$ and K$^2$≥4n, n represents a length of the spread spectrum watermark; preferably, a minimum value of k is 10.

Step S1020: the magnified host image is divided into K×K blocks, on which the DCT operation is performed respectively. Coefficients at row i, column i of a block DCT coefficient matrix are selected to form a K×K one-level DCT coefficient matrix, and the DCT process is performed on the one-level DCT coefficient matrix again to ultimately obtain a K×K two-level DCT coefficient matrix. Preferably, the coefficients at row i, column i should represent low- and medium-frequency coefficients in the blocks.

Figure 2:
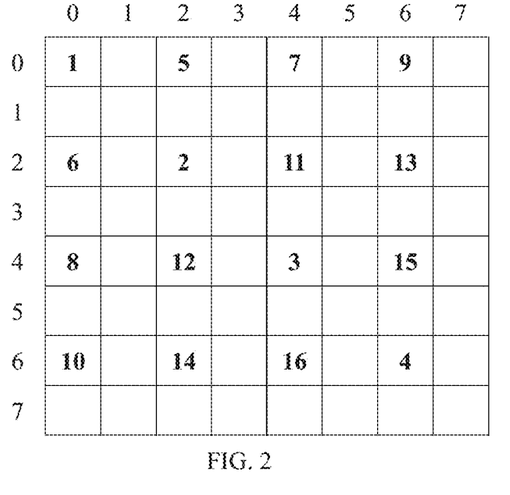
FIG. 2 is a schematic diagram showing a location selection and a sequence of coefficients constructing a feature vector in the course of watermark embedding in or extraction from an image.

Step S1030: coefficients from the two-level DCT coefficient matrix with even row index and even column index (the row index and column index start from 0) are selected to form a feature vector. Taking an 8×8 matrix as an example, a coefficient selection and a sequence are shown in FIG. 2. First, coefficients in a leading diagonal of the two-level DCT coefficient matrix are extracted, then, a coefficient on the upper right of the leading diagonal is extracted, and a coefficient on the lower left of the leading diagonal is extracted, and so forth; the coefficients extracted in the above two steps are connected, the first n coefficients are selected to construct the feature vector, and the feature vector is expressed as $V=[v_0, v_1, \ldots, v_{n-1}]$.

The present disclosure is not limited to the selection method of the feature vector described in step S1000. Any method capable of extracting the DCT coefficients to form the feature vector can be applied to the present disclosure.

Step S1100: a binary watermark to be embedded is converted into the spread spectrum watermark with self-adaptive embedding strength, and the spread spectrum watermark is embedded into the feature vector.

Specifically, the step S1100 may include: step S1110 to step S1140.

Step S1110: an original binary watermark is initialized.

The original watermark is expressed as $W=[w_0, w_1, \ldots, w_{m-1}]$, a length of W is m, $w_i \in \{0,1\}$, the watermark is initialized as $W_I = [l_0, l_1, \ldots, l_{m-1}]$, and an initializing method is described as follows:

$$l_i = \begin{cases} 1, & w_i = 1 \\ -1, & w_i = 0 \end{cases}, i = 0, 1, \ldots, m-1 \qquad (1)$$

Specifically, the original watermark is recorded copyright information in diversified forms, all of which can be converted into a binary sequence consisting of 0 and 1.

Step S1120: m orthogonal unit code vectors are randomly generated.

A series of random numbers are generated based on a secret key, and the random numbers are in a sequence arranged into an m×n (n≥m) two-dimensional data matrix; each row of the matrix represents one code vector with a length of n, and m code vectors in total are included; all of the code vectors are orthogonalized by using Gram-Schmidt process, and each of the orthogonalized vectors are normalized. Assuming an i$^{th}$ code vector is $P_i = [p_{i0}, p_{i1}, \ldots, p_{i(n-1)}]$, i=0, 1, ..., m−1; wherein $C(P_i, P_i)=1$ and $C(P_i, P_j)=0$ (i≠j), C(•) represents an inner product of two vectors.

Step S1130: the initialized watermark is converted into the spread spectrum watermark with the self-adaptive embedding strength.

A formation process of the spread spectrum watermark is as follows:

The spread spectrum watermark is designed by utilizing the prior knowledge of host signal interference ($C(V, P_i)$), and the spread spectrum watermark is proven to be capable of completely shielding the host signal interference. Since understanding the proving process requires clarifying all steps of the present disclosure, the proving process will be described after introducing all steps of the present disclosure. The spread spectrum watermark is expressed as $W' = [w_0', w_1', \ldots, w_{n-1}']$, and a length of $W'$ is n ($n \geq m$); an expression is as follows:

$$W' = \sum_{i=0}^{m-1} ((A \cdot l_i - \lambda_i \cdot C(V, P_i)) \cdot P_i) \quad (2)$$

where, $C(V, P_i)$ is related to information of the host image and is a host signal interference; a control parameter $\lambda_i$ is used to control the host signal interference, and satisfies $$\begin{cases} \lambda_i \leq 1, & C(V, P_i) \cdot l_i \geq 0 \\ \lambda_i \geq 1, & C(V, P_i) \cdot l_i < 0 \end{cases}, i = 0, 1, \ldots, m-1;$$

A represents the embedding strength of the watermark for adjusting robustness of the watermarking method, and satisfies $A \geq 0$.

According to the equation (2), the initialized watermark ($W_i$) can be converted into the spread spectrum watermark ($W'$) with the self-adaptive embedding strength; a spread spectrum operation can make energy of the original binary watermark more scattered, which is conductive to showing imperceptibility and robustness of the watermark.

Step S1140: the spread spectrum watermark is embedded in the feature vector.

As shown in the equation (3), the spread spectrum watermark is embedded into the feature vector by a superimposition; the feature vector embedded with the watermark is expressed is $V' = [v_0', v_1', \ldots, v_{n-1}']$.

$$V' = V + W' \quad (3)$$

Specifically, step S1130 may further include step S1131 to step S1133.

Step S1131: an optimal value of the control parameter $\lambda_i$ is set.

When $C(V, P_i)$ and $l_i$ have a same sign, and satisfy one of two conditions as follows, $\lambda_i$ is set as 0, otherwise, $\lambda_i$ is set as 1;

$$\sum_{i=0}^{m-1} C(V, P_i)^2 - \frac{\left(\sum_{i=0}^{m-1}(l_i \cdot C(V, P_i))\right)^2}{m} \geq \frac{255^2 \cdot M \cdot N}{10^{PSNR/10}} \quad (4)$$

$$\frac{\sum_{i=0}^{m-1}(l_i \cdot C(V, P_i))}{m} < 0 \text{ and } \sum_{i=0}^{m-1} C(V, P_i)^2 \geq \frac{255^2 \cdot M \cdot N}{10^{PSNR/10}} \quad (5)$$

A theoretical analysis shows that setting $\lambda_i$ in such a manner can achieve a tradeoff between robustness and imperceptibility of the watermarking method. Since understanding the analyzing process requires clarifying all steps of the present disclosure, the analyzing process will be described after introducing all steps of the present disclosure.

Step S1132: a value of the embedding strength A is self-adaptively obtained.

As for the spread spectrum watermark embedding method, a relationship between the embedding strength A and a peak signal-to-noise ratio (PSNR) is as follows:

$$mA^2 + \sum_{i=0}^{m-1} (\lambda_i \cdot C(V, P_i))^2 - 2A \sum_{i=0}^{m-1} (l_i \cdot \lambda_i \cdot C(V, P_i)) = \frac{255^2 \cdot M \cdot N}{10^{PSNR/10}} \quad (6)$$

A deducing process is described as follows:

The peak signal-to-noise ratio is an objective standard to measure the image quality and can be a proper indicator for measuring imperceptibility of watermark. The larger the value of the PSNR, the less the difference between images, and better imperceptibility of watermark. Assuming a size of the image is M×N, the host image is represented as I, and the watermarked image is represented as I'. A mean square error (MSE) and the peak signal-to-noise ratio (PSNR) between the host image and the watermarked image are respectively expressed as follows:

$$MSE = \frac{1}{MN} \sum_{i=0}^{M-1} \sum_{j=0}^{N-1} \|I'(i,j) - I(i,j)\|^2$$

$$PSNR = 10 \cdot \log_{10}\left(\frac{MAX_I^2}{MSE}\right)$$

Where, $MAX_I$ represents a maximum gray value of pixels in the host image, which is commonly set as 255.

Imperceptibility of watermark depends on the embedding energy of the watermark. The larger the embedding energy of the watermark, the poorer the imperceptibility. In the spread spectrum watermarking method, the embedding strength is used to control the embedding energy of the watermark. The value of the embedding strength also determines robustness of the watermarking method. Increasing the value can improve robustness, however, since the embedding energy of the watermark is simultaneously increased, imperceptibility declines and vice versa. Therefore, the embedding strength can be used to adjust the robustness of and imperceptibility of the watermarking method.

The discrete cosine transform-based watermarking method has an energy conservative property. Thus, a relationship between the DCT coefficients before and after watermark embedding and the pixels of the host images before and after watermark embedding is as follows:

$$\sum_{i=0}^{M-1} \sum_{j=0}^{N-1} \|D'(i,j) - D(i,j)\|^2 = \sum_{i=0}^{M-1} \sum_{j=0}^{N-1} \|I'(i,j) - I(i,j)\|^2$$

Where $D'(i, j) - D(i, j)$ represents the difference between the DCT coefficients at row i and column j before and after the watermark is embedded. A left side of the equation represents the embedding energy of the watermark.

In the preferred embodiment, the two-level DCT operation is performed (namely another DCT operation is performed on the coefficients which have been already subjected to a first DCT operation). According to an embedding rule (step S1120), a modification amount of the coefficients obtained after a second DCT operation is the embedding energy of the watermark:

$$\sum_{i=0}^{M-1}\sum_{j=0}^{N-1}\|D_2'(i, j) - D_2(i, j)\|^2 = W' \cdot W'$$

where, $D_2'(i, j) - D_2(i, j)$ represents the difference between the coefficients at row i and column j in the second DCT coefficient matrix before and after the watermark is embedded.

According to the energy conservative property of DCT, the relationship between the DCT coefficients before and after embedding the watermark and the pixels of the host images before and after embedding the watermark is as follows:

$$W' \cdot W' = \sum_{i=0}^{M-1}\sum_{j=0}^{N-1}\|D_1'(i, j) - D_1(i, j)\|^2 = \sum_{i=0}^{M-1}\sum_{j=0}^{N-1}\|I'(i, j) - I(i, j)\|^2$$

Where, $D_1'(i, j) - D_1(i, j)$ represents the difference between the coefficients at row i, column j of the first DCT coefficient matrix before and after embedding the watermark.

The expression of the peak signal-to-noise ratio can be converted as:

$$\sum_{i=0}^{M-1}\sum_{j=0}^{N-1}\|I'(i, j) - I(i, j)\|^2 = \frac{255^2 \cdot M \cdot N}{10^{PSNR/10}}$$

combining the aforementioned two equations and the expression of the spread spectrum watermark, a relationship between the embedding strength A and the peak signal-to-noise ratio (PSNR) is:

$$W' \cdot W' =$$

$$mA^2 + \sum_{i=0}^{m-1}(\lambda_i \cdot C(V, P_i))^2 - 2A\sum_{i=0}^{m-1}(l_i \cdot \lambda_i \cdot C(V, P_i)) = \frac{255^2 \cdot M \cdot N}{10^{PSNR/10}}$$

The above expression establishes the relationship between robustness (robustness depends on the embedding strength) and imperceptibility (imperceptibility is reflected by the peak signal-to-noise ratio).

As the values of the PSNR and $\lambda_i$ are given, the expression is a quadratic equation of the embedding strength (A). A maximum value of the embedding strength (A) can be fast calculated by figuring out the expression using the binary search algorithm. In the expression, $C(V, P_i)$ is related to the information of the host image. Therefore, through the expression, the embedding strength can be self-adaptively adjusted according to different host images, and each image can obtain a specific peak signal-to-noise ratio, which maximums robustness of the watermarking method, and ensures imperceptibility of each image in the meanwhile.

The two-level discrete cosine transform is merely one preferred embodiment of the present disclosure. The present disclosure is not only limited to the two-level DCT operation. As long as the watermark is embedded into the DCT domain, the present disclosure is applicable, and such embodiments should fall within the scope of the present disclosure.

Step S1133: the initialized watermark is converted into the spread spectrum watermark.

By substituting the feature vector (V) of the host image, the randomly generated code vector (P), the initialized watermark ($W_I$), the corresponding control parameter ($\lambda$), and the embedding strength (A) into the equation (2), the spread spectrum watermark (W') with the corresponding self-adaptive embedding strength can be obtained.

Step S1200: the DCT coefficient matrix is updated using the feature vector embedded with the spread spectrum watermark, subsequently, an inverse discrete cosine transform is performed on the coefficient matrix to obtain the image embedded with the watermark.

Step S1200 is a reverse process of step S1000, which specifically includes step S1210 to S1230.

Step S1210: coefficients in the feature vector embedded with the spread spectrum watermark are used to replace coefficients at corresponding positions of the two-level DCT coefficient matrix to obtain the two-level DCT coefficient matrix after the watermark is embedded.

Step S1220: the inverse discrete cosine transform process is performed on the two-level DCT coefficient matrix embedded with the watermark to obtain the one-level DCT coefficient matrix, and each coefficient of the one-level DCT coefficient matrix is used for substituting the coefficient at row i, column i of each block DCT coefficient matrix. The updated block DCT coefficient matrix is subjected to inverse discrete cosine transform process again, and the (enlarged) image embedded with the watermark is determined.

Step S1230: the (enlarged) image embedded with the watermark is shrunk to a same size with the original host image, so as to determine the image embedded with the watermark.

Figure 3:
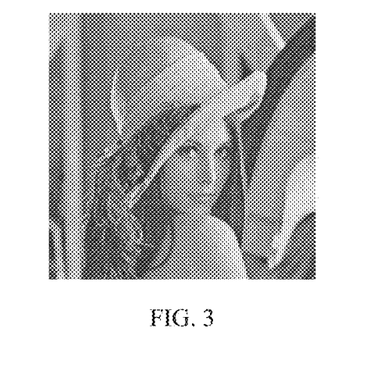
FIG. 3 shows an image before embedding a watermark.
Figure 4:
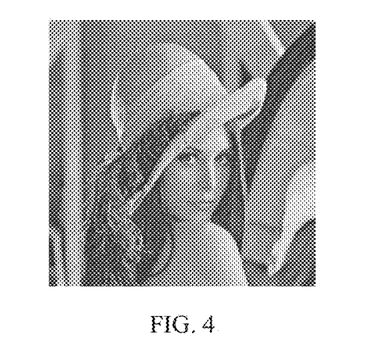
FIG. 4 shows the image after embedding the watermark.

As shown in FIGS. 3 and 4, FIG. 3 schematically shows the image before embedding the watermark; FIG. 4 schematically shows the image after embedding the watermark.

The method for embedding the spread spectrum with the self-adaptive embedding strength will be described hereinafter in detail with reference to a preferred embodiment.

In the present embodiment, 85 rectangular natural scene images and 15 square natural scene images of different sizes in the image processing field are randomly selected as the host images.

In the present embodiment, a randomly generated 128-bit 0-1 sequence is used as the original watermark, and a 0-1 sequence having a length of 128 bits can basically realize a relatively comprehensive description of the copyright information. The original watermark is converted into a 256-bit spread spectrum watermark, so that the energy of the watermark is more dispersed.

A minimal magnification is performed on the host image so that the host image meets a requirement that both the height and width of the host image are greater than 320 and capable of being divided by 32.

The enlarged image is divided into 32×32 blocks, on which the DCT operation is performed respectively. The coefficients at the row 6, column 6 of the block DCT coefficient matrices are selected to form a 32×32 one-level DCT coefficient matrix, and the one-level DCT coefficient matrix is performed with the DCT process again to obtain a 32×32 two-level DCT coefficient matrix.

A 256-bit feature vector is selected from the two-level DCT coefficient matrix according to the coefficient selection method and sequence shown in FIG. 2.

According to the equation (1), the original binary watermark is initialized.

128 of 256-bit orthogonal unit code vectors are randomly generated.

When $C(V, P_i)$ and $l_i$ have a same sign, if the equations (4) and (5) are satisfied, the control parameter $\lambda_i$ is set as 0, otherwise, the control parameter $\lambda_i$ is set as 1.

Let PSNR=45 dB, the equation (6) is figured out using the binary search algorithm to obtain the value of the embedding strength A.

The feature vector, the initialized watermark, the code vector, the control parameter, and the embedding strength obtained above are substituted into the equation (2), and the 128-bit binary watermark is converted into a 256-bit spread spectrum watermark.

According to the equation (3), the spread spectrum watermark is embedded into the feature factor by superposition.

The two-level DCT coefficient matrix is updated using the feature vector embedded with the watermark, and then the coefficient matrix is performed with the inverse discrete cosine transform and scaling to obtain the image embedded with the watermark.

It should be illustrated that:

For the host images whose sizes do not meet the requirements, a precision loss exists in the magnification operation and the domain transform process, which will have some impacts on the image quality. Therefore, the given peak signal-to-noise ratio needs to be slightly larger than the required peak signal-to-noise ratio after the image is embedded with the watermark. In the present preferred embodiment, even if no watermark is embedded (W' is set as 0), an average peak signal-to-noise ratio of the 100 watermarked images is up to 46.64 dB; and after embedding the watermark according to the above steps, the average peak signal-to-noise ratio is 40.55 dB. In general, the peak signal-to-noise ratio greater than 40 dB represents a very good visual quality. As shown in FIGS. 3 and 4, the two images do not show differences before and after the watermark is embedded from the visual side.

Figure 5:
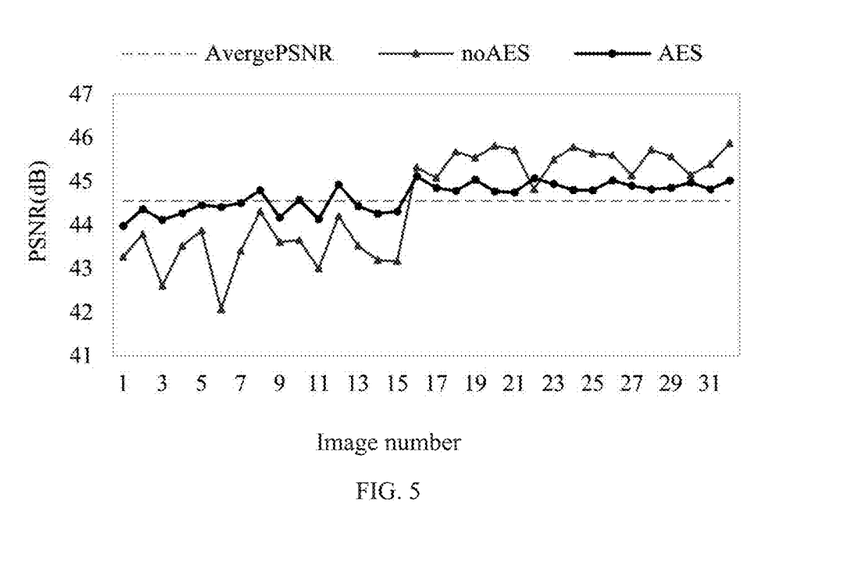
FIG. 5 is a schematic diagram comparing peak signal-to-noise ratios of watermarked images obtained by embedding watermarks with a fixed embedding strength and a self-adaptive embedding strength, respectively.

In order to demonstrate the self-adaptive adjustment of the embedding strength can ensure imperceptibility of each image, in the preferred embodiment, the embedding strength A is directly set as a fixed value of 70 to obtain the same average peak signal-to-noise ratio as the self-adaptive embedding strength is used. The peak signal-to-noise ratios of various images obtained using the fixed embedding strength and self-adaptive embedding strength are compared. At the same time, degree of deviations of the peak signal-to-noise ratios of the various images obtained using the fixed embedding strength and the self-adaptive embedding strength from the average peak signal-to-noise ratio are compared. In order to avoid the influence of the image magnification operation on the peak signal-to-noise ratio, in the present embodiment, 32 images that do not need to be magnified are selected from the 100 images. FIG. 5 shows the peak signal-to-noise ratios of the 32 watermarked images, wherein no AES indicates the use of the fixed embedding strength, while AES indicates the use of self-adaptive embedding strength. It can be seen that with the fixed embedding strength, the peak signal-to-noise ratios of many images are lower than the average value (expected value), which means the embedded watermark may be perceived. The use of self-adaptive embedding strength ensures that the peak signal-to-noise ratios of all images are substantially close to the average value, thus ensuring imperceptibility.

Figure 6:
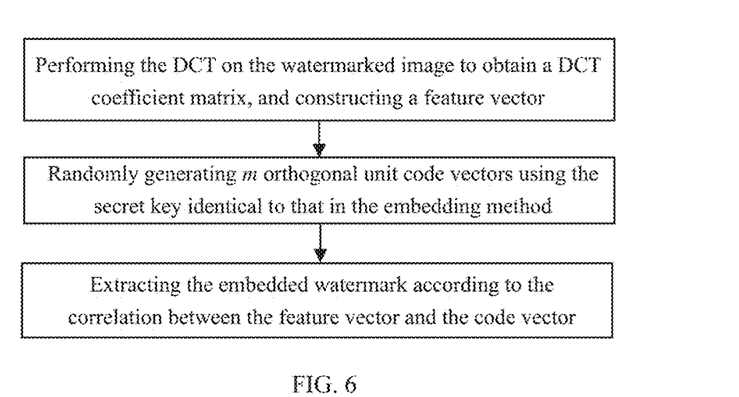
FIG. 6 is a schematic block diagram showing a spread spectrum watermark extraction method.

The embodiment of the present invention further provides a spread spectrum-based watermark extracting method. As shown in FIG. 6, the method includes the following steps:

The watermarked image is performed with the discrete cosine transform to obtain a DCT coefficient matrix, and a feature vector is constructed.

The feature vector is established using the method identical to step S1000 of the embedding method. The feature vector is expressed as $V^*=[v_0^*, v_1^*, \ldots, v_{n-1}^*]$, wherein $V^*$ has a length of n, and $V^*$ are not always equal to V', because the image at this time may have been subjected to some kinds of image processing attacks or geometric attacks.

m orthogonal unit code vectors are randomly generated using the secret key identical to that in the embedding method.

The embedded watermark is extracted according to the correlation between the feature vector and the code vector. An extracted watermark sequence is expressed as $W^*=[w_0^*, w_1^*, \ldots, w_{m-1}^*]$ with a length of m, and:

$$w_i^* = \begin{cases} 1, & C(V^*, P_i) \geq 0 \\ 0, & C(V^*, P_i) < 0 \end{cases}$$

wherein $C(\bullet)$ is an inner product of two vectors with a same length. $C(V^*, P_i)$ is also called an extractor. In this way, the embedded watermark sequence is extracted.

Whether each extracted watermark is right or not depends on the extractor ($C(V^*, P_i)$). $C(V^*, P_i)$ includes two parameters, $V^*$ and $P_i$, wherein $P_i$ is the $i^{th}$ orthogonal unit code vector satisfying: $C(P_i, P_i)=1$ and $C(P_i, P_j)=0$ ($i \neq j$). $V^*$ is the feature vector extracted from the watermarked image. Assuming N represents a variation quantity of the feature vector due to the attacks, according to an embedding principle described in step S1140 of the embedding method, an equation can be obtained as $V^*=V'+N=V+W'+N$. Therefore, the extractor can be factorized as:

$$C(V^*, P_i) = C(V, P_i) + C(W', P_i) + C(N, P_i)$$
$$= C(V, P_i) + C\left(\sum_{i=0}^{m-1}((A \cdot l_i - \lambda_i \cdot C(V, P_i)) \cdot P_i), P_i\right) + C(N, P_i)$$
$$= (1 - \lambda_i)C(V, P_i) + A \cdot l_i + C(N, P_i)$$

when $C(V^*, P_i)$ and have a same sign, it indicates that the $i^{th}$ extracted watermark is right. The sign of $C(V^*, P_i)$ is collectively determined by $(1-\lambda_i)C(V, P_i)$, $A \cdot l_i$, and $C(N, P_i)$, wherein $C(V, P_i)$ represents an influence brought by the host image itself, i.e., the host signal interference; $A \cdot l_i$, represents an effect of the embedding strength, due to A>0, $A \cdot l_i$, always has the same sign as $l_i$, for enhancing robustness of the watermarking method; $C(N, P_i)$ represents an impact caused by the attacks. According to the definition of the spread spectrum watermark, when $C(V, P_i)$ and $l_i$ have the same sign, $\lambda_i \leq 1$; otherwise, $\lambda_i \geq 1$; so we can know: $(1-\lambda_i)C(V, P_i)$ also has the same sign as $l_i$, and $(1-\lambda_i)C(V, P_i)$ will not affect a validity of extracting the watermark. If $\lambda_i=1$, the present disclosure can completely shield a carrier signal interference. If $\lambda_i$ is away from 1, the host signal interference further helps the extractor to resist the negative impact caused by the attacks.

Although as $|\lambda_i-1|$ is larger, the extractor shows stronger robustness, in the meanwhile, imperceptibility is diminished as the embedding energy of the watermark increases. When $\lambda_i$ is set as 1, optimal imperceptibility can be obtained. Hence, robustness and imperceptibility place opposite requirements on $\lambda_i$, and the setting of the value of $\lambda_i$ needs a proper trade-off.

$\lambda_i$ plays a role in controlling the host signal interference ($C(V, P_i)$). As for different host images, $C(V, P_i)$ considerably differs from each other. Therefore, it is hard to ensure that each bit of extracted watermark has relatively stronger robustness by adjusting the value of $\lambda_i$. In contrast, more consistent robustness can be obtained by increasing the embedding strength (A). Therefore, we tend to increase the embedding strength (A) to enhance robustness and set $\lambda_i$ as 1 to avoid the negative impact on imperceptibility. However, as for some images, this setting is not optimal. If an image meets the two following cases, it may result in that the value of the embedding strength figured out by the self-adaptive method is 0, making the image embedded with the watermark barely invulnerable to any attack.

$$\sum_{i=0}^{m-1}(\lambda_i \cdot C(V, P_i))^2 - \left(\sum_{i=0}^{m-1}(l_i \cdot \lambda_i \cdot C(V, P_i))\right)^2 \Big/ m \geq$$

$$(255^2 \cdot M \cdot N)/10^{PSNR/10}$$

$$A^* < 0 \text{ and } \sum_{i=0}^{m-1}(\lambda_i \cdot C(V, P_i))^2 \geq (255^2 \cdot M \cdot N)/10^{PSNR/10}$$

As for the first case, to minimize the left side of the inequation, $\lambda_i$ should be equal to 0; as for the second case, as $\lambda_i$, gets closer to 0, $\Sigma_{i=0}^{m-1}(\lambda_i \cdot C(V, P_i))^2$ is lower. To avoid these two cases and improve robustness of these images, the value of $\lambda_i$ should be set as 0. Therefore, when all $\lambda_i$ are set as 1, as for images which satisfy one of the aforementioned two cases, if $C(V, P_i)$ has the same sign as $l_i$, $\lambda_i=0$ is set; if $C(V, P_i)$ has a different sign from $l_i$, $\lambda_i=1$ is maintained, because at the time $\lambda_i=1$ is the minimum value of $\lambda_i$.

In conclusion, when $C(V, P_i)$ has the same sign as $l_i$, and one of the following two conditions is satisfied, $\lambda_i$ is set as 0, otherwise, $\lambda_i$ is set as 1.

$$\sum_{i=0}^{m-1} C(V, P_i)^2 - \frac{\left(\sum_{i=0}^{m-1}(l_i \cdot C(V, P_i))\right)^2}{m} \geq \frac{255^2 \cdot M \cdot N}{10^{PSNR/10}}$$

$$\frac{\sum_{i=0}^{m-1}(l_i \cdot C(V, P_i))}{m} < 0 \text{ and } \sum_{i=0}^{m-1} C(V, P_i)^2 \geq \frac{255^2 \cdot M \cdot N}{10^{PSNR/10}}$$

Therefore, setting $\lambda_i$ in this way can help balance robustness and imperceptibility of the watermarking method.

Robustness of the watermarking method is generally evaluated using a bit error rate (BER). The bit error rate is a ratio of a number of wrong bits to a total number of bits, obtained by comparing the extracted watermark with the original watermark. As the bit error rate is lower, robustness of the watermark is better. The bit error rates of the original watermark sequence $W=[w_0, w_1, \ldots, w_{m-1}]$ and the extracted watermark sequence $W^*=[w_0^*, w_1^*, \ldots, w_{m-1}^*]$ are calculated as follows:

$$BER = \frac{\sum_{i=0}^{m-1} e_i}{m} \times 100\%,$$

$$e_i = \begin{cases} 0, & w_i = w_i^* \\ 1, & w_i \neq w_i^* \end{cases}$$

100 watermarked images obtained using the watermark embedding method according to the above embodiment are respectively performed with various image processing attacks, including JPEG compression with a quality factor of 60%, a Gauss noise with a variance of 0.01, a Salt&Pepper noise with the density of 0.04, a 3×3 of average filter, a 3×3 of median filter, a histogram equalization, a brightness decrease to 60% of the original and a brightness increase to 120% of the original, etc. Subsequently, the watermark in the watermarked image after subjected to attacks is extracted by using the spread spectrum-based watermark extracting method according to the embodiment, which is compared with the original watermark, so as to obtain an average bit error rate of 100 extracted watermarks shown in Table 1:

TABLE 1

| Attack Type | Parameter | Bit Error Rate |
| --- | --- | --- |
| JPEG Compression | 60% | 0.00% |
| Gauss Noise | 0.01 | 0.03% |
| Salt & Pepper Noise | 0.04 | 0.12% |
| Average Filter | 3 × 3 | 0.00% |
| Median Filter | 3 × 3 | 0.13% |
| Histogram equalization | — | 0.07% |
| Brightness adjustment | 0.6 | 0.00% |
|  | 1.2 | 0.00% |

100 watermarked images obtained using the watermark embedding method according to the above embodiment are respectively performed with various geometrical attacks, including a horizontal flip, a vertical flip, a 90-degrees anticlockwise rotation, a 180-degrees anticlockwise rotation, an image resizing with a quality factor of 60%, an image resizing with a quality factor of 200%, and an extension at an aspect ratio of 0.8×0.4, etc. Subsequently, the watermark in the watermarked image after subjected to attacks is extracted by using the spread spectrum-based watermark extracting method according to the embodiment, which is compared to the original watermark, so as to obtain an average bit error rate of 100 extracted watermarks shown in Table 2:

TABLE 2

| Attack Type | Parameter | Bit Error Rate |
| --- | --- | --- |
| Flip | horizontal | 0.00% |
|  | vertical | 0.00% |
| Rotation | 90° | 0.00% |
|  | 180° | 0.00% |
| Resizing | 0.6 | 0.09% |
|  | 2.0 | 0.00% |
| Aspect ratio adjustment | 0.8 × 1.4 | 0.00% |

As shown in Table 1, Table 2, and FIG. 5, facing common image processing attacks and geometric attacks, the watermark can be 100% extracted by the embodiment of the present disclosure, and a high peak signal-to-noise ratio of about 40 dB can be ensured in each image. Therefore, it can be proved the present disclosure can not only effectively resist various image processing attacks and geometric attacks, having relatively stronger robustness, but also ensure imperceptibility of the watermark in each image.

In watermarking method according to the above embodiment, let PSNR=45 dB, different values of $\lambda_i$ are set, which includes the following steps: the values of $\lambda_i$ are set according to step S1131, expressed as 0/1-1/1; all values of $\lambda_i$ are set as 1, expressed as 1/1; when $C(V^*, P_i)$ has the same sign as $l_i$, the value of $\lambda_i$ is set as 0, and when $C(V^*, P_i)$ and $l_i$ have different signs, the value of $\lambda_i$ is set as 1, expressed by 0/1; when $C(V^*, P_i)$ has the same sign as $l_i$, the value of $\lambda_i$ is set as 0, and when $C(V^*, P_i)$ and $l_i$ have different signs, the value of $\lambda_i$ is set as 2, expressed by 0/2; when $C(V^*, P_i)$ has the same sign as $l_i$, the value of $\lambda_i$ is set as −1, and when $C(V^*, P_i)$ and $l_i$ have different signs, the value of $\lambda_i$ is set as 3, expressed by −1/3; the watermarked images obtained by using different values of $\lambda_i$ are performed with various attacks, and then the watermark in the watermarked image after subjected to attacks is extracted by using the spread spectrum-based watermark extracting method according to the embodiment, which is compared to the original watermark, so as to obtain an average bit error rate of 100 extracted watermarks shown in Table 3:

TABLE 3

| Attack Type | Parameter | 0/1-1/1 | 1/1 | 0/1 | 0/2 | −1/3 |
| --- | --- | --- | --- | --- | --- | --- |
| JPEG Compression | 60% | 0.00% | 0.00% | 0.16% | 0.16% | 1.05% |
| Gauss Noise | 0.01 | 0.03% | 0.03% | 0.03% | 0.47% | 2.40% |
| Salt & Pepper Noise | 0.04 | 0.12% | 0.12% | 0.23% | 0.73% | 3.14% |
| Average Filter | 3 × 3 | 0.00% | 0.00% | 0.00% | 0.19% | 1.09% |
| Median Filter | 3 × 3 | 0.13% | 0.13% | 0.24% | 0.45% | 2.15% |
| Histogram Equalization | — | 0.07% | 0.07% | 0.07% | 0.49% | 2.19% |
| Brightness Adjustment | 0.6 | 0.00% | 0.00% | 0.00% | 0.02% | 0.42% |
| | 1.2 | 0.00% | 0.00% | 0.00% | 0.04% | 0.70% |
| Flip | Horizontal | 0.00% | 0.00% | 0.00% | 0.00% | 0.37% |
| | Vertical | 0.00% | 0.00% | 0.00% | 0.00% | 0.37% |
| Rotation | 90° | 0.00% | 0.00% | 0.00% | 0.00% | 0.37% |
| | 180° | 0.00% | 0.00% | 0.00% | 0.00% | 0.37% |
| Resizing | 0.6 | 0.09% | 0.09% | 0.14% | 0.43% | 1.82% |
| | 2.0 | 0.00% | 0.00% | 0.00% | 0.02% | 0.45% |
| Aspect ratio adjustment | 0.8 × 1.4 | 0.00% | 0.00% | 0.00% | 0.08% | 0.62% |

It can be seen from the results, as the value of $\lambda_i$ gets farther away from 1, robustness of the watermark is poorer, which is consistent with the theoretical analysis. It can be further seen that, the results when $\lambda_i$ is set as 0/1-1/1 are identical to the results when $\lambda_i$ is set as 1/1, because when PSNR=45 dB, none of 100 images satisfies the condition described in step S1131. In fact, all values of $\lambda_i$ are 1 at that time. When PSNR=−50 dB, the average bit error rate of 100 extracted watermarks is shown in Table 4:

TABLE 4

| Attack Type | Parameter | 0/1-1/1 | 1/1 |
| --- | --- | --- | --- |
| JPEG Compression | 60% | 3.15% | 4.84% |
| Gauss Noise | 0.01 | 5.41% | 6.68% |
| Salt & Pepper Noise | 0.04 | 7.73% | 9.23% |
| Average Filter | 3 × 3 | 2.52% | 4.06% |
| Median Filter | 3 × 3 | 4.88% | 6.12% |

TABLE 4-continued

| Attack Type | Parameter | 0/1-1/1 | 1/1 |
| --- | --- | --- | --- |
| Histogram Equalization | — | 2.81% | 4.92% |
| Brightness Adjustment | 0.6 | 0.30% | 2.51% |
| | 1.2 | 0.62% | 2.62% |
| Flip | horizontal | 0.24% | 2.47% |
| | vertical | 0.24% | 2.47% |
| Rotation | 90° | 0.24% | 2.47% |
| | 180° | 0.24% | 2.47% |
| Resizing | 0.6 | 3.77% | 5.21% |
| | 2.0 | 0.46% | 2.42% |
| Aspect ratio adjustment | 0.8 × 1.4 | 0.67% | 2.95% |

It can be seen from the results that, the present disclosure performs better when $\lambda_i$ is set as 0/1-1/1. It is because when is $\lambda_i$ set as 1/1, some images cannot satisfy the conditions described in step S1131, which leads to a failure of watermark extraction and affects the average bit error rate. Therefore, it proves that it is optimal to set $\lambda_i$ as 0/1-1/1.

Those skilled in the art should understand the aforementioned assumptions are merely examples, which should not be considered as improper limitation of the present disclosure.

In the above embodiment, although the steps are described in sequence as above, those skilled in the art can understand that in order to implement the effects of the present embodiment, it is unnecessary to perform different steps in the above order, and different steps can be performed simultaneously (in parallel) or in reverse order. These simple changes are within the scope of the present invention.

It should be noted that, the method for embedding the spread spectrum with the self-adaptive embedding strength can be applied to various discrete cosine transform-based watermarking technologies. Any DCT-based image watermarking technology achieved by the method for embedding the spread spectrum watermark with self-adaptive embedding strength according to the present disclosure should be considered as falling within the scope of the present disclosure.

The technical solutions provided by the embodiments of the present invention are described in detail above. Although the principles and implementations of the present invention have been described with reference to specific examples, the description of the above embodiments is only used for facilitating understanding of the principles of the embodiments of the present invention. In the meanwhile, as for those skilled in the art, changes may be made within the scope of the specific embodiments and applications according to the embodiments of the present disclosure.

It should be noted that, the flowcharts or block diagrams referred to in the present disclosure are not merely limited to the form shown in the present disclosure, but may be divided or combined.

It should be noted that, the designators and words in the drawings are merely intended to illustrate the present disclosure more clearly, and should not be considered as improperly limiting to the scope of the present disclosure It should be noted that, the terms 'first', 'second', etc. in specification, claims and drawings, are used for distinguishing similar objects, rather than describing a specific order or a sequential order. It should be understood that, data used in this way can be interchanged in some proper situations, so that the above-mentioned embodiments of the present disclosure can be implemented in orders except for those described in the drawings and the specification.

The term 'include' or any other similar words are intended to cover non-exclusive inclusion, so that processes, methods, matters, or equipment/devices that include a plurality of elements include not only those elements, but also other elements which are not specifically enumerated, or further include those elements that the processes, methods, matters, or equipment/devices inherently have.

The various steps of the present invention can be implemented with general computing devices. For example, they can be integrated on a single computing device, such as a personal computer, a server computer, a handheld device or a portable device, a tablet device, or a multi-processor device. The steps may also be distributed on a network composed of a plurality of computing devices. The above-mentioned devices may perform the steps shown or described in the present disclosure in an order different from the one described herein or may be respectively integrated into various integrated circuit modules. Alternatively, a plurality of modules of the above devices or steps are made into a single integrated circuit module for implementation. Thus, the present invention is not limited to any specific hardware, software or a combination thereof.

The method provided by the present invention can be implemented using programmable logic devices or can be implemented using computer program software or program modules (including routines, programs, objects, components or data structures that perform specific tasks or implement specific abstract data types, etc.). For example, according to the embodiments of the present invention, the device may be a computer program product that is operated to enable the computer to perform the demonstrated method. The computer program product includes a computer readable storage medium in which computer program logic or code portions is contained for implementing the method. The computer readable storage medium may be a built-in medium installed in a computer or a removable medium capable of being dismounted from a computer main body (e.g., a storage device using a hot plug technology). The built-in medium includes, but is not limited to, a rewritable non-volatile memory such as a RAM, a ROM, a flash memory, and a hard disk. The removable medium includes, but is not limited to, optical storage media (e.g., CD-ROM and DVD), magneto-optical storage media (e.g., MO), magnetic storage media (e.g., magnetic tape or mobile hard disk), media provided with a built-in rewritable non-volatile memory (e.g., a memory card) and media provided with a built-in ROM (e.g., a ROM box).

The aforementioned specific embodiments further describe the objectives, technical solutions, and advantages of the present disclosure in detail. It should be understood that, the above-mentioned embodiments are merely specific embodiments of the present disclosure and are not used to limit the present disclosure. Any modifications, equivalent substitutions and improvements within the spirits and principles of the present disclosure, should be considered as falling within the scope of the present disclosure.

What is claimed is:

1. A method for embedding a spread spectrum watermark into images with a self-adaptive embedding strength, comprising:
   performing a discrete cosine transform (DCT) on a host image to obtain a DCT coefficient matrix and constructing a feature vector;
   converting a binary watermark to be embedded into the spread spectrum watermark with the self-adaptive embedding strength and embedding the spread spectrum watermark into the feature vector; and
   using the feature vector embedded with the spread spectrum watermark to update the DCT coefficient matrix, then performing an inverse discrete cosine transform (IDCT) on the DCT coefficient matrix to obtain an image embedded with the spread spectrum watermark;
   wherein the step of converting the binary watermark to be embedded into the spread spectrum watermark with the self-adaptive embedding strength and embedding the spread spectrum watermark into the feature vector comprises the following steps:
   initializing an original binary watermark, wherein the original binary watermark is expressed as $W=[w_0, w_1, \ldots, w_{m-1}]$, a length of $W$ is m, $w_i \in \{0,1\}$, and a method of initializing the original binary watermark as $W_I=[l_0, l_1, \ldots, l_{m-1}]$ described in an equation (1), comprises:

$$l_i = \begin{cases} 1, & w_i = 1 \\ -1, & w_i = 0 \end{cases}, \quad i = 0, 1, \ldots, m-1 \tag{1}$$

randomly generating m orthogonal unit code vectors; assuming an $i^{th}$ code vector is $P_i=[p_{i0}, p_{i1}, \ldots, p_{i(n-1)}]$, a length of $P_i$ is n (n≥m), i=0, 1, ..., m−1; wherein $C(P_i, P_i)=1$ and $C(P_i, P_j)=0$ (i≠j), and $C(\bullet)$ represents an inner product of two vectors;
   converting, according to an equation (2), an initialized original binary watermark into the spread spectrum watermark with the self-adaptive embedding strength; wherein the spread spectrum watermark is expressed as $W'=[w_0', w_1', \ldots, w_{n-1}']$, a length of $W'$ is n (n≥m), and an expression of $W'$ is as follows:

$$W' = \sum_{i=0}^{m-1} ((A \cdot l_i - \lambda_i \cdot C(V, P_i)) \cdot P_i) \tag{2}$$

wherein, $C(V, P_i)$ is related to information of the host image and represents a host signal interference; a control parameter $\lambda_i$ is configured to control the host signal interference, and satisfies $$\begin{cases} \lambda_i \leq 1, & C(V, P_i) \cdot l_i \geq 0 \\ \lambda_i \geq 1, & C(V, P_i) \cdot l_i < 0 \end{cases}, \quad i = 0, 1, \ldots, m-1;$$

A represents the embedding strength of the spread spectrum watermark for adjusting robustness of the spread spectrum watermarking method, and satisfies A≥0;
   as shown in an equation (3), embedding the spread spectrum watermark into the feature vector by a superimposition, and the feature vector embedded with the spread spectrum watermark is $V'=[v_0', v_1', \ldots, v_{n-1}']$, and $$V'=V+W' \tag{3}$$

2. The method for embedding the spread spectrum watermark into images with the self-adaptive embedding strength according to claim 1, wherein the step of performing the discrete cosine transform on the host image to obtain the DCT coefficient matrix and constructing the feature vector comprises the following steps:
   performing the discrete cosine transform on the host image to be embedded with the spread spectrum watermark; and picking n coefficients in the DCT coefficient matrix to establish the feature vector, wherein the feature vector is expressed as $V=[v_0, v_1, \ldots, v_{n-1}]$.

3. The method for embedding the spread spectrum watermark into images with the self-adaptive embedding strength according to claim 1, wherein the step of converting an initialized watermark into the spread spectrum watermark with the self-adaptive embedding strength comprises the following steps:

setting an optimal value of a control parameter $\lambda_i$: when $C(V, P_i)$ and $l_i$ have a same sign, and satisfy one of two conditions shown in an equation (4) or an equation (5), as follows, setting $\lambda_i$ as 0, otherwise, setting $\lambda_i$ as 1;

$$\sum_{i=0}^{m-1} C(V, P_i)^2 - \frac{\left(\sum_{i=0}^{m-1} (l_i \cdot C(V, P_i))\right)^2}{m} \geq \frac{255^2 \cdot M \cdot N}{10^{PSNR/10}} \quad (4)$$

$$\frac{\sum_{i=0}^{m-1} (l_i \cdot C(V, P_i))}{m} < 0 \text{ and } \sum_{i=0}^{m-1} C(V, P_i)^2 \geq \frac{255^2 \cdot M \cdot N}{10^{PSNR/10}} \quad (5)$$

self-adaptively obtaining a value of an embedding strength A; a relationship between the embedding strength A and a peak signal-to-noise ratio (PSNR) is expressed as an equation (6) as follows:

$$mA^2 + \sum_{i=0}^{m-1} (\lambda_i \cdot C(V, P_i))^2 - 2A \sum_{i=0}^{m-1} (l_i \cdot \lambda_i \cdot C(V, P_i)) = \frac{255^2 \cdot M \cdot N}{10^{PSNR/10}} \quad (6)$$

wherein the equation (6) establishes a relationship between robustness and imperceptibility; as the values of the PSNR and $\lambda_i$ are given, the equation (6) is figured out using a binary search algorithm, so that a maximum value of the embedding strength A can be quickly calculated; and
according to the equation (2), converting the initialized watermark into the spread spectrum watermark.

\* \* \* \* \*